(12) United States Patent
Blacquiere et al.

(10) Patent No.: US 6,796,367 B2
(45) Date of Patent: Sep. 28, 2004

(54) VEHICLE BATTERY CHARGING AND AIR CONDITIONING OPERATING UNIT

(75) Inventors: Shane Blacquiere, Montague (CA); Janet Petrunia-Blacquiere, Montague (CA)

(73) Assignee: Inventive Technologies Foundation, Panama (PA)

( * ) Notice: Subject to any disclaimer, the term of this patent is extended or adjusted under 35 U.S.C. 154(b) by 0 days.

(21) Appl. No.: 10/330,100

(22) Filed: Dec. 30, 2002

(65) Prior Publication Data

US 2003/0089485 A1 May 15, 2003

Related U.S. Application Data

(63) Continuation-in-part of application No. 09/944,401, filed on Sep. 4, 2001, now abandoned.
(60) Provisional application No. 60/311,370, filed on Aug. 13, 2001.

(51) Int. Cl.$^7$ .............................. B60H 1/00; B60H 1/32
(52) U.S. Cl. ......................... 165/41; 62/236; 62/323.1; 62/243; 62/244
(58) Field of Search ............................. 165/41; 62/236; 62/323.1, 243, 244

(56) References Cited

U.S. PATENT DOCUMENTS

| | | | |
|---|---|---|---|
| 3,455,403 A | | 7/1969 | Hawthorne |
| 3,841,108 A | | 10/1974 | Pierrat |
| 3,842,378 A | * | 10/1974 | Pierce ....................... 192/84 A |
| 3,844,130 A | | 10/1974 | Wahnish |
| 3,877,639 A | | 4/1975 | Wilson et al. |
| 4,010,378 A | | 3/1977 | Tharpe et al. |
| 4,280,330 A | | 7/1981 | Harris et al. |
| 4,293,281 A | * | 10/1981 | Lamoreaux ................... 417/9 |
| 4,531,379 A | | 7/1985 | Diefenthaler, Jr. |
| 4,611,466 A | | 9/1986 | Keedy |
| 4,682,649 A | | 7/1987 | Greer |
| 4,756,359 A | | 7/1988 | Greer |
| 4,846,327 A | * | 7/1989 | Mayer ....................... 192/84 A |
| 4,909,044 A | | 3/1990 | Gudmundsen |
| RE33,687 E | | 9/1991 | Greer |
| 5,048,657 A | | 9/1991 | Dissett et al. |
| 5,177,978 A | | 1/1993 | Brown |
| 5,249,429 A | * | 10/1993 | Hanson ....................... 62/236 |
| 5,896,750 A | | 4/1999 | Karl |

FOREIGN PATENT DOCUMENTS

| | | | | |
|---|---|---|---|---|
| DE | 19623475 C1 | * | 6/1996 | |
| DE | 19703209 C1 | * | 7/1998 | ............ B60H/1/32 |
| GB | 2278463 | | 11/1994 | |
| JP | 8-142642 | * | 6/1996 | |
| WO | WO 99/09360 | | 2/1999 | |

* cited by examiner

*Primary Examiner*—John K. Ford
(74) *Attorney, Agent, or Firm*—R. Craig Armstrong; Borden Ladner Gervais LLP

(57) ABSTRACT

An auxiliary engine generates electricity through an alternator, to charge the vehicle battery and selectively run an electric motor for air conditioning when the vehicle's primary engine is not operating. Operation of the electric motor produces rotation of the drive shaft of the vehicle's air conditioning compressor, the output shaft of the electric motor being connected via a centrifugal clutch, and a drive belt on a pulley integral to the clutch, to a pulley bolted directly to the drive shaft of the compressor. There is no use made of the vehicle's existing electromagnetic clutch at the compressor location, i.e. it remains disengaged when the auxiliary system is operating, and is engaged only when air conditioning is called for in normal vehicle operation, i.e. when the primary engine is running. The electricity generated by the auxiliary engine can also be used to operate other accessories, if desired, such as lighting, televisions, VCRs, refrigerators and other like accessories.

14 Claims, 8 Drawing Sheets

VEHICLE BATTERY CHARGING AND AIR CONDITIONING OPERATING UNIT

REFERENCE TO RELATED APPLICATIONS

This is a continuation-in-part of application Ser. No. 09/944,401, filed Sep. 4, 2001 now abandoned, which was based on and claimed the benefit of provisional application No. 60/311,370, filed Aug. 13, 2001.

BACKGROUND OF THE INVENTION

1. Field of the Invention

This invention relates to a secondary system for operating a vehicle air conditioning unit and other accessories. The invention is particularly intended for tractor-trailers for long-distance trucking, but could be adapted to other vehicle types as desired.

Although vehicle air conditioning and accessories can be operated by running the primary engine of the vehicle, this is very wasteful in terms of energy consumption, even at lower running speeds, and generates excessive exhaust emissions. There is a need for a system which allows the air conditioner and other accessories to be operated without running the primary engine, and without excessive energy consumption and emissions.

2. Description of the Prior Art

U.S. Pat. No. 3,844,130 (Wahnish) describes a system which superficially is somewhat similar to that of the present invention, but which involves a significantly more complicated clutching arrangement, among other disadvantages. In Wahnish, there are two pulleys on the end of the air conditioning compressor shaft which cannot rotate independently. Therefore three clutches are required for the system to be operable, namely one at the fan (primary engine) location, one at the compressor location, and one at the electric (auxiliary) motor location. For the primary vehicle engine to drive the compressor in normal vehicle operation, the fan clutch and the compressor clutch must be engaged, and the electric motor clutch must be disengaged. For the electric motor to drive the compressor, i.e. when the primary vehicle engine is not operating, the fan clutch needs to be disengaged, and the compressor clutch and electric motor clutch need to be engaged.

U.S. Pat. No. 4,531,379 (Diefenthaler, Jr.) describes a system which is also superficially somewhat similar to that of the present invention, but which uses a mechanical connection, via a "jack shaft" assembly, between an auxiliary engine and the air conditioner compressor, among other significant differences. It is quite a complex system, and in most vehicles, even large trucks, would be quite impractical in terms of space demands. The auxiliary engine and jack shaft assembly must be physically accommodated adjacent the air conditioner compressor, which is plainly impossible in many vehicles, or impractical in almost all. Diefenthaler, Jr. also fails to provide for independent operation of the air conditioning system, since there is a dual pulley which simultaneously drives the air conditioner compressor and the water pump which cools his auxiliary engine.

SUMMARY OF THE INVENTION

In view of the above, it is an object of the invention to provide a secondary system for operating the vehicle air conditioner and other accessories, and for battery charging, which is simple, inexpensive and easy to install, in an area of limited space, and which avoids the complexity and other problems of the above-mentioned prior art.

In the invention, an auxiliary power source such as a small gas or diesel engine is used to generate electricity through an alternator, which is used to charge the vehicle battery and selectively run an electric motor. The electric motor is connected via a centrifugal clutch, and a drive belt on a pulley integral to the clutch, to a pulley mounted to the drive shaft of the vehicle's air conditioner compressor. The electricity can also be used to operate other accessories, if desired, such as lighting, televisions, VCRs, refrigerators and other like accessories.

In the invention, the pulley at the air conditioner compressor location which carries the belt from the electric motor can rotate independently of the pulley which carries the belt to the primary engine. This is because it is bolted directly to the end of the compressor drive shaft, not to the other (clutched) pulley. Operation of the system therefore does not require a clutch at the primary engine location; the electric motor can therefore drive the compressor with the belt to the primary engine, (and its pulley at the compressor location) remaining stationary. Nor does the invention make any use of the vehicle's electromagnetic clutch at the compressor location.

Installation of the system is therefore much simpler than with any of the prior art systems; the auxiliary motor is installed at any suitable location, the additional pulley is bolted to the front of the compressor drive shaft, the electric motor with its centrifugal clutch is mounted nearby, a belt is installed between the additional pulley and the pulley which is integral with the centrifugal clutch, and the appropriate wiring connections are made as will be described in detail later. Thus a vehicle can be retrofitted with this system quickly and inexpensively.

Further features will be described or will become apparent in the course of the detailed description which follows.

BRIEF DESCRIPTION OF THE DRAWINGS

The invention will now be described in greater detail, with reference to the accompanying drawings of the preferred embodiment, in which.

DETAILED DESCRIPTION

Figure 1:
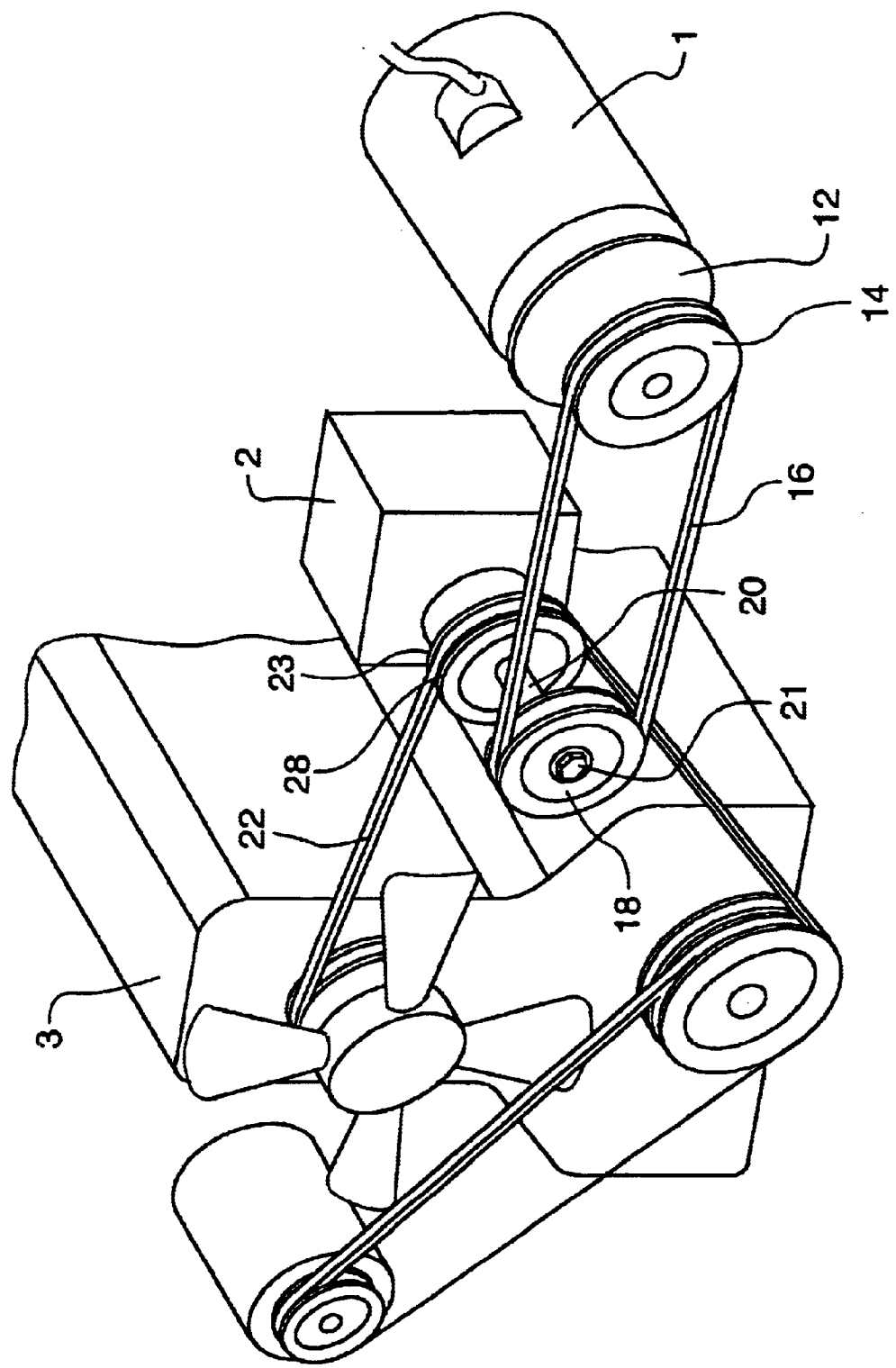
FIG. 1 is a schematic perspective illustration of the invention.

As illustrated in the accompanying drawings, the main add-on component of the invention is an electric motor 1, which is mounted by any suitable means in the vicinity of the vehicle's air conditioner compressor 2. The motor is only activated when the primary engine 3 is off, the auxiliary system is switched on via a switch 4 in the cab of the vehicle, and the vehicle air conditioning controls 5 call for cooling. As will be explained later below, the electric motor 1 is powered from a battery 6, which is charged by operation of an auxiliary motor 7 through an alternator 8 via a coupler 9.

Figure 2:
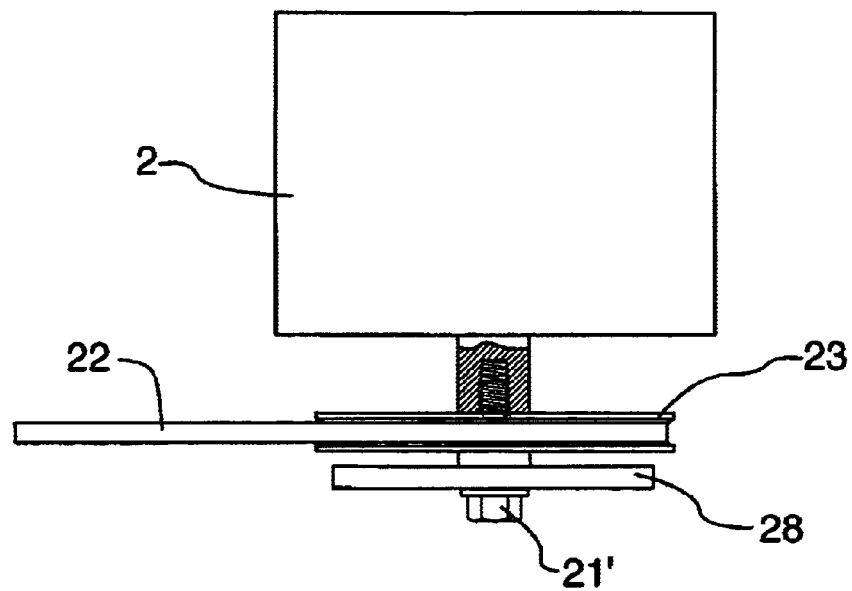
FIG. 2 (prior art) is a schematic top view of a prior art air conditioner compressor.
Figure 3:
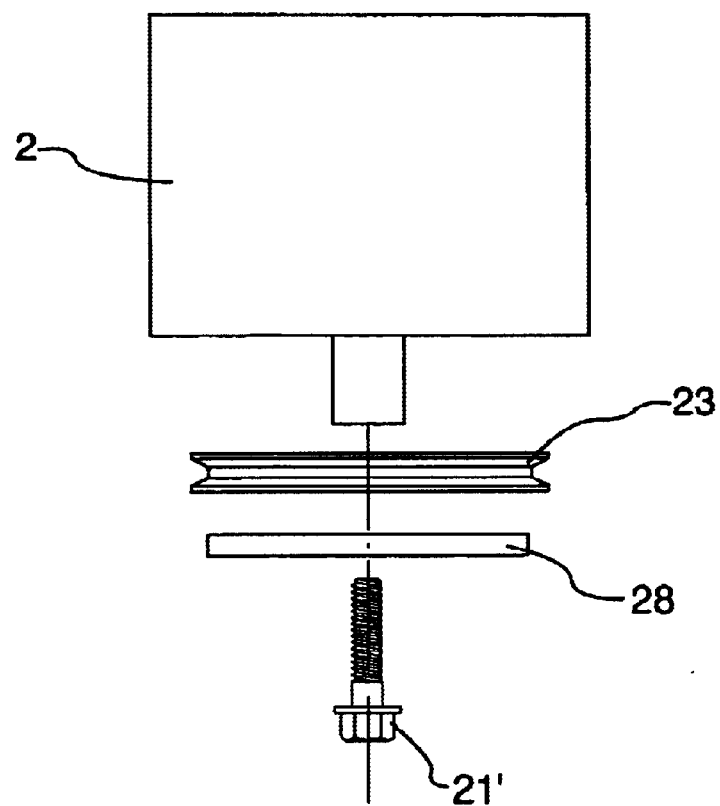
FIG. 3 (prior art) is an exploded view corresponding to FIG. 2.
Figure 4:
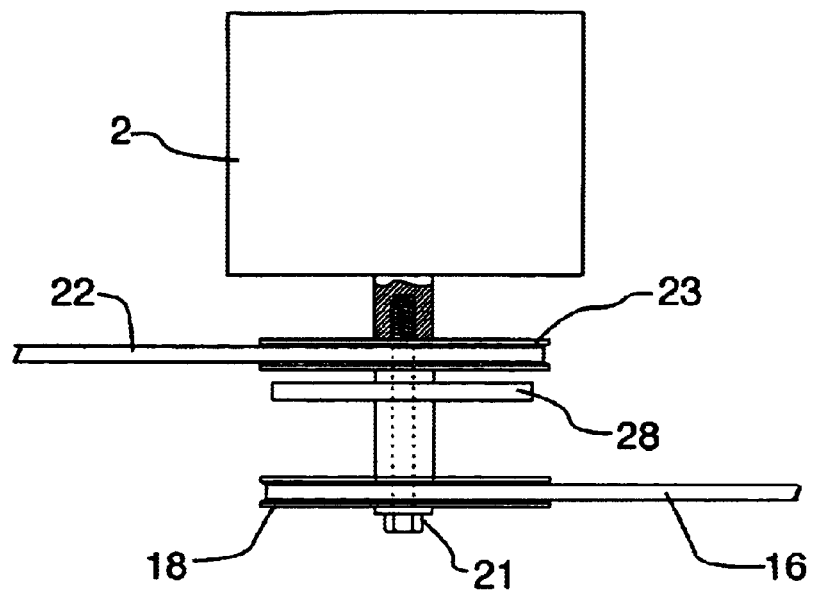
FIG. 4 is a schematic top view of an air conditioner compressor adapted to the invention.
Figure 5:
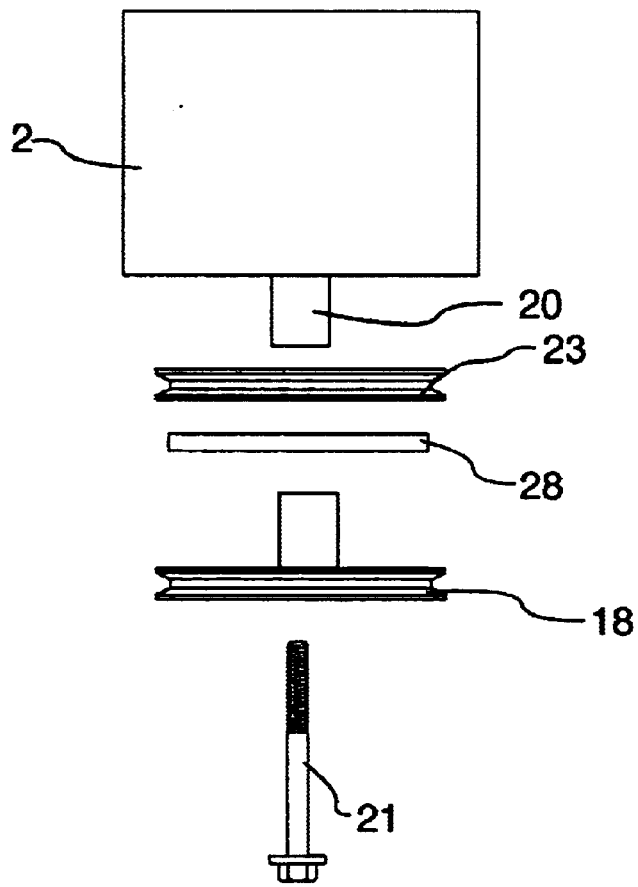
FIG. 5 is an exploded view corresponding to FIG. 4.

On the output shaft of the electric motor 1 is a centrifugal clutch 12 with an integral pulley 14. As with any centrifugal clutch, it engages only when the electric motor output shaft rotates. A drive belt 16 runs from the pulley 14 to a pulley 18 installed on the end of the drive shaft 20 of the vehicle's air conditioner compressor 2. The bolt 21' which is already present (see FIGS. 2 and 3) is removed and replaced with a longer bolt 21 (see FIGS. 4 and 5) to hold the pulley. In normal operation of the air conditioning system when the vehicle's primary engine is running, there is no power to the electric motor. If there is no demand for air conditioning, the drive belt 22 from the primary engine rotates the pulley 23, but there is no rotation of the belt 16 and pulley 14, because the existing electromagnetic clutch 28 is not energized to actuate its hub to engage the compressor drive shaft 20. Since the compressor drive shaft 20 is not rotating, and is what the pulley 18 is mounted on, the pulley 18 is not rotating.

When the vehicle's primary engine is running, and there is demand for air conditioning, the drive belt 22 from the primary engine rotates the pulley 23, and because the electromagnetic clutch 28 is energized by the demand, the compressor drive shaft 20 rotates. There is thus also rotation of the belt 16 and pulley 14, but the electric motor is isolated from that rotation because the centrifugal clutch 12 is not engaged.

When the vehicle's primary engine is not on, and the system is switched on via the switch 4, the auxiliary motor 7 is started, generating electricity through the alternator 8 and charging the battery 6. Then when the air conditioning controls call for cooling, a relay 25 which would normally route power to the electromagnetic clutch 28 of the air conditioner compressor 2, to engage the compressor, instead routes power to the electric motor 1. The centrifugal clutch is thereby activated, i.e. by rotation of the electric motor output shaft, so that the pulley 14 is rotated, which in turn drives the air conditioner compressor via the belt 16 and pulley 18. The air conditioner compressor is free to rotate independently from the primary engine, since it is only coupled with the engine when its electromagnetic clutch 28 is activated by the vehicle air conditioning controls.

Thus the air conditioner compressor can be driven in one of two ways: by the primary engine when the primary engine is on and the air conditioning controls call for cooling and engage the electromagnetic clutch 28, or when the primary engine is off, and the electric motor is activated on demand from the vehicle air conditioning controls, so that its centrifugal clutch drives the belt 16 and pulley 18 mounted directly on the end of the compressor drive shaft 20.

The auxiliary motor 7 can be, for example, a small gas or diesel motor, or any other motor with sufficient power to generate enough electricity. It could also be an electric motor, for example, powered by solar cells or via a household electrical power outlet. It may be located behind a lower portion of the cab, or at any other desired location where there is sufficient room, since it does not need to be adjacent the primary engine 3, the electric motor 1, or the air conditioner compressor 2.

The system further includes an electrically operated cooling fan 30 for selectively cooling air conditioning fluid circulating in the vehicle air conditioner, since the vehicle primary engine cooling fan is not in operation when the auxiliary system is used. The fan is switched on and off by demand from either the air conditioning system or the vehicle temperature control system, depending on the configuration of the particular vehicle system. (Some trucks cycle their fans on and off by temperature controls, while others operate the fans continuously, but in either case, the fan 30 will turn on when cooling is required.) A relay switch 42, activated when the auxiliary system is selected via switch 4, directs power to the fan 30 instead of to the primary engine fan. The location of the fan 30 is not specifically illustrated herein, but it may be positioned in any suitable location for the desired cooling.

A water-cooled power source could also be connected to the existing vehicle heater system, to provide heat if required when the auxiliary engine is running, or an electric heater can be used within the vehicle cab.

Figure 6:
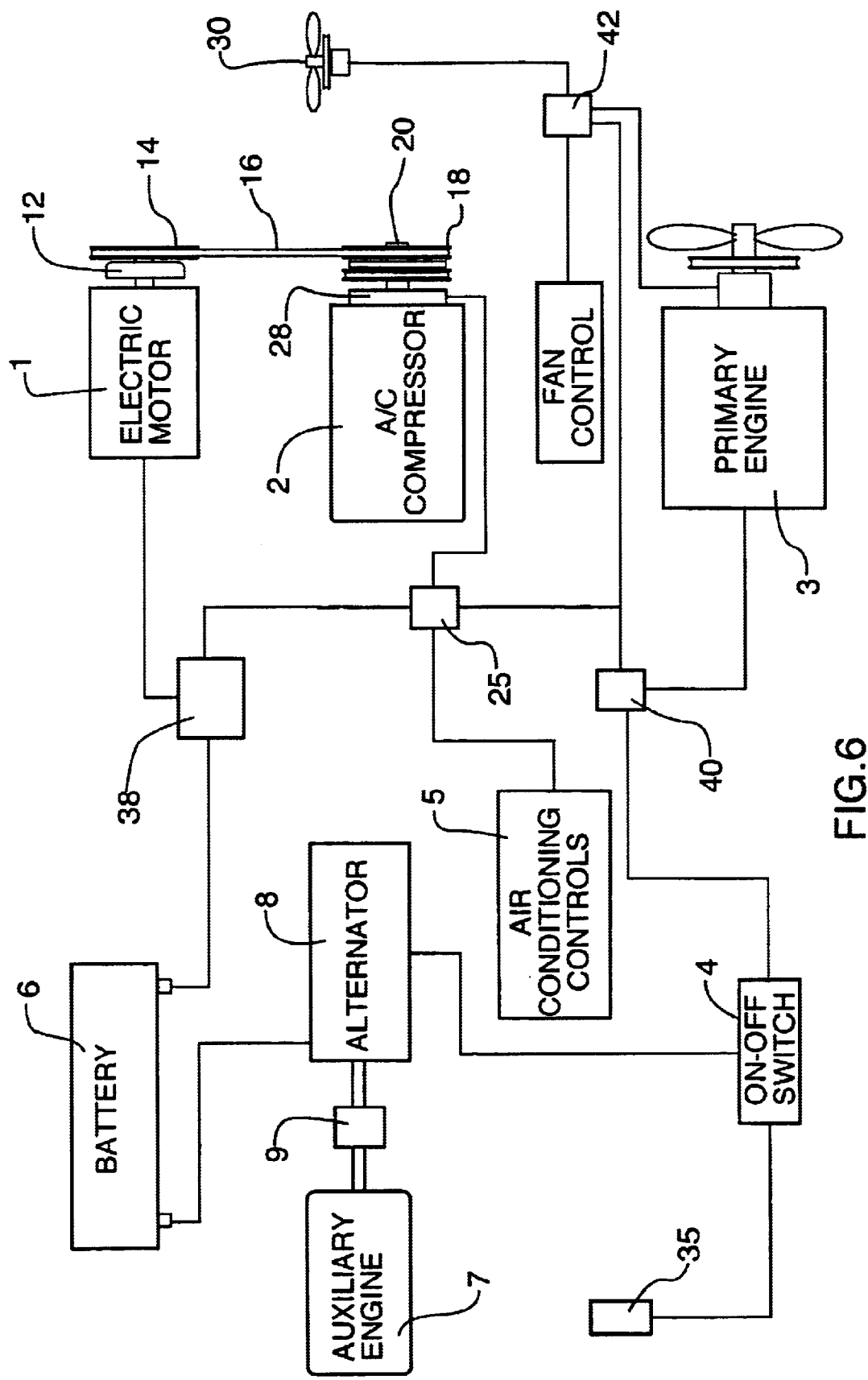
FIG. 6 is a schematic illustration of the invention.
Figure 7:
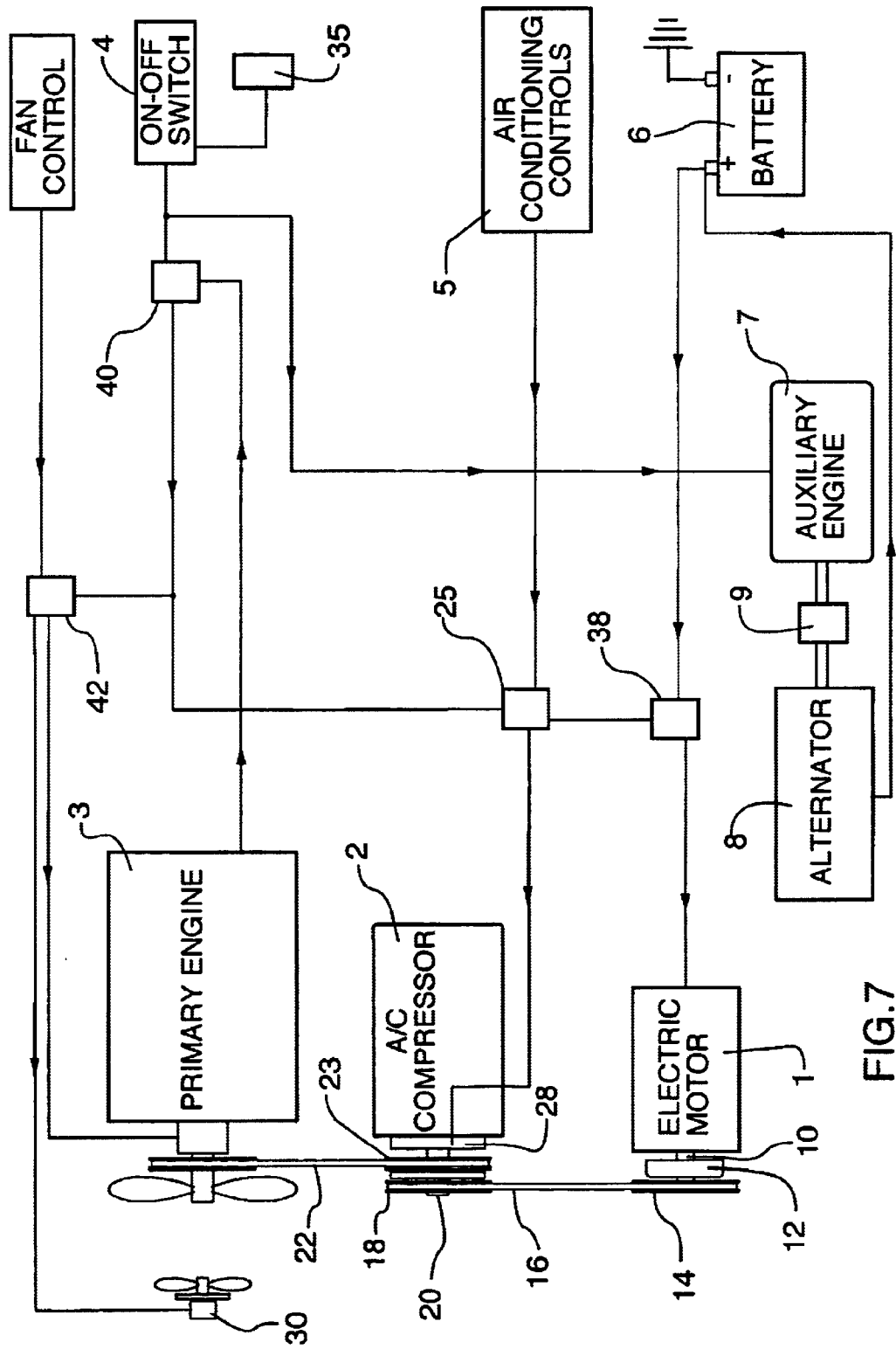
FIG. 7 is another schematic illustration of the invention, similar to FIG. 6.

FIGS. 6–8 provide various schematic illustrations of the system wiring and controls. With the vehicle's main ignition 35 on, the switch 4 turns on the auxiliary motor 7, and activates relay switches 25 and 42, to change the position of all the relay switch contacts, to divert power from the existing vehicle electrical system to the auxiliary system. This provides battery charging from the auxiliary motor, and allows the use of the vehicle's electrical accessories without draining the battery. If the main ignition 35 is off, the switch 4 is inoperative.

When the main ignition 35 and switch 4 are on, and the air conditioning controls in the cab are on, then when the air conditioning system calls for cooling, power is directed to operate a solenoid switch 38 to route power from the battery to the electric motor 1.

If the primary engine 3 is turned on while the switch 4 is on, a safety shut-off relay switch 40 between the air conditioning portion of the system and the vehicle primary engine is activated, to change the position of all the relay contacts, to route power back to the existing electrical system and disable the auxiliary system of the invention. However, the connection to the auxiliary motor 7 remains operational, so that the auxiliary motor can be used as an alternative battery charging system if the vehicle's primary battery charging system fails. Preferably, the switch 4 is illuminated when on, as an indication to the operator and as a reminder to turn it off if not needed.

Figure 8A:
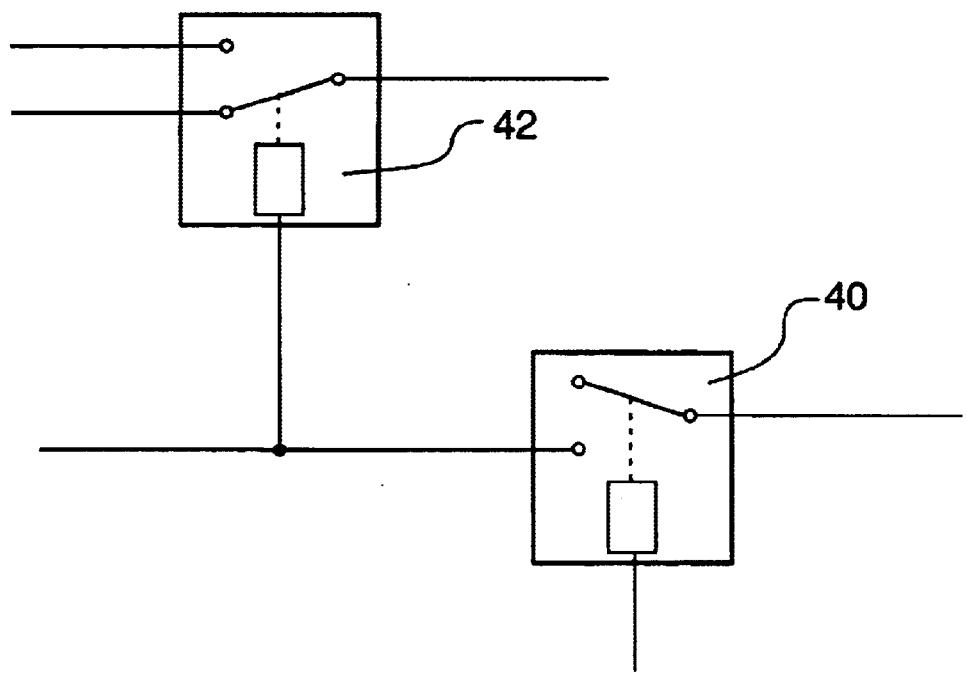
FIGS. 8A–8F are schematic illustrations of various relay and solenoid contact positions in different operating states.
Figure 8B:
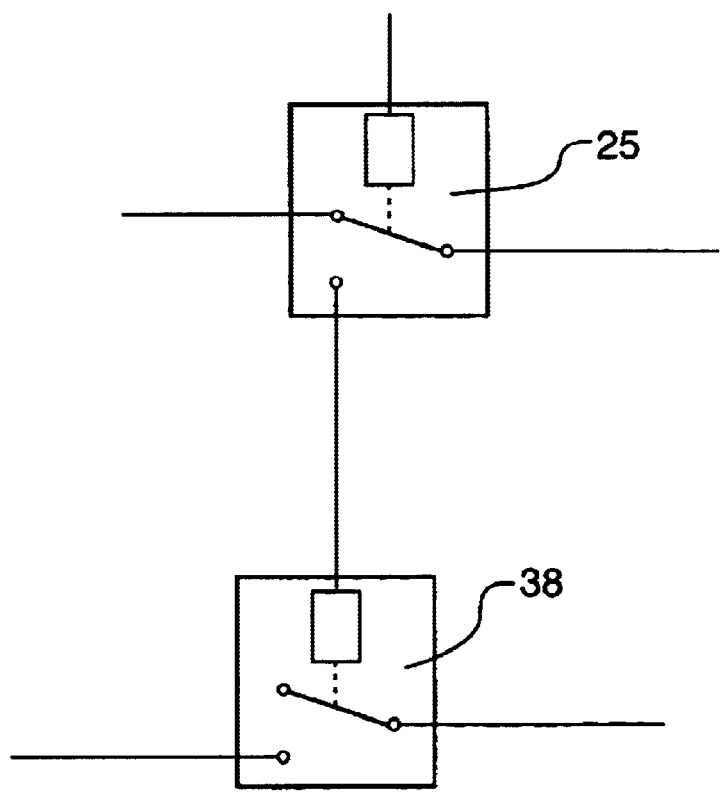

Referring to FIGS. 8A–8F specifically, the positions of various relay and solenoid contacts in different operating states are illustrated schematically. FIG. 8A shows the position of the fan relay 42 and safety shut-off relay 40 contacts during operation of the vehicle's primary engine. FIG. 8B shows the position of the solenoid switch 38 and air conditioning relay switch 25 during operation of the vehicle's primary engine.

Figure 8C:
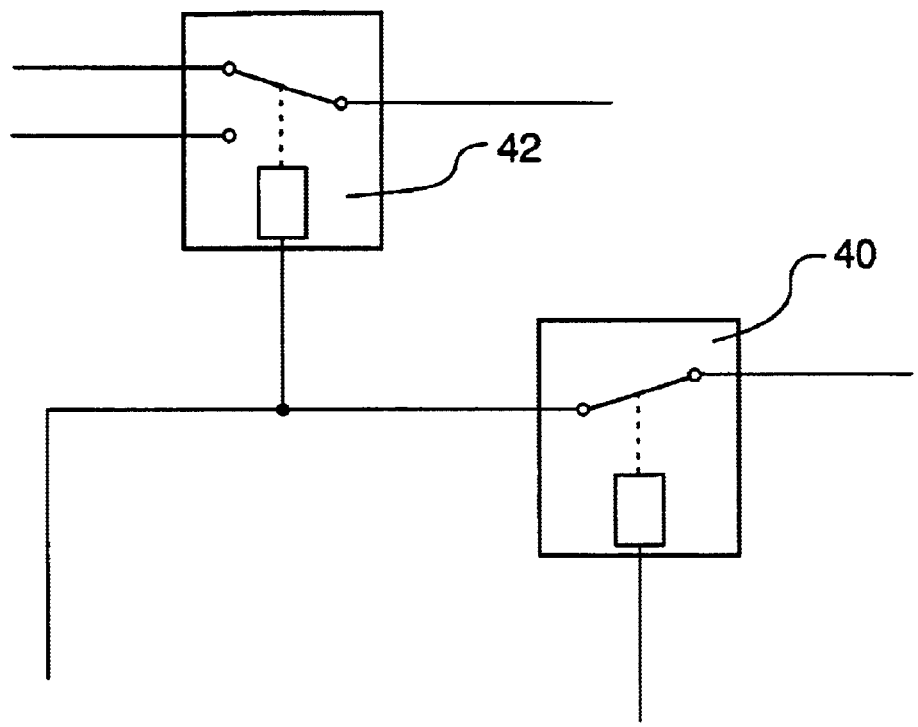

FIG. 8C shows the position of the fan relay 42 and safety shut-off relay 40 contacts when the vehicle's primary engine is off, and the auxiliary system is switched on, i.e. by switch 4.

Figure 8D:
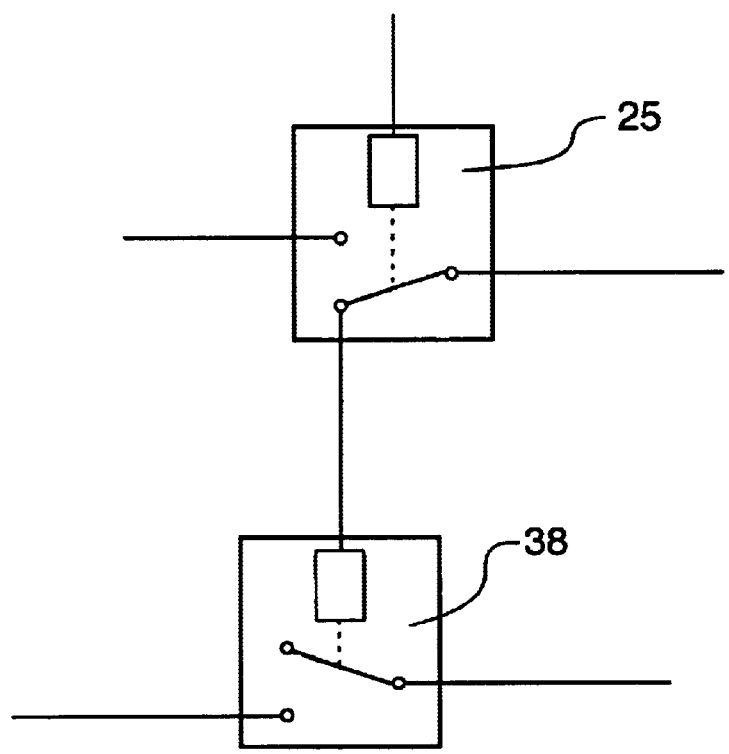
Figure 8E:
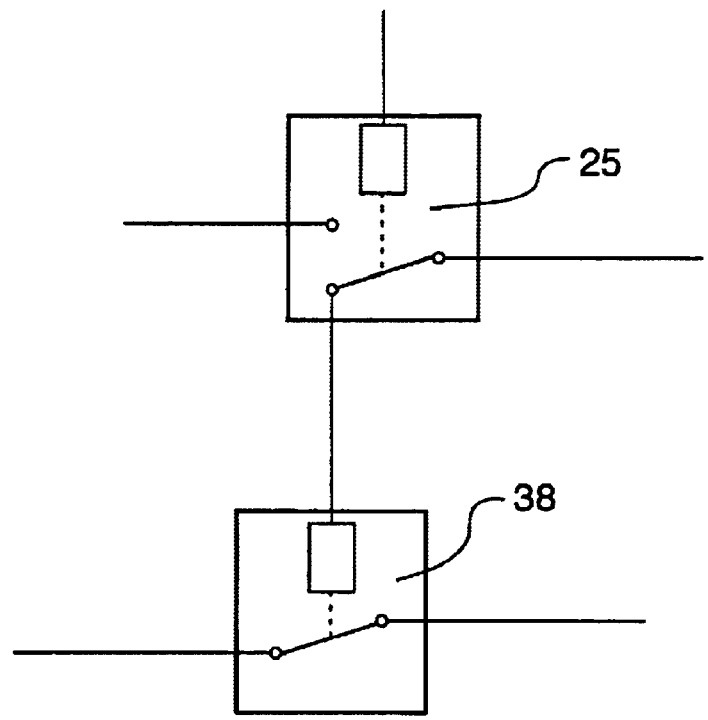
Figure 8F:
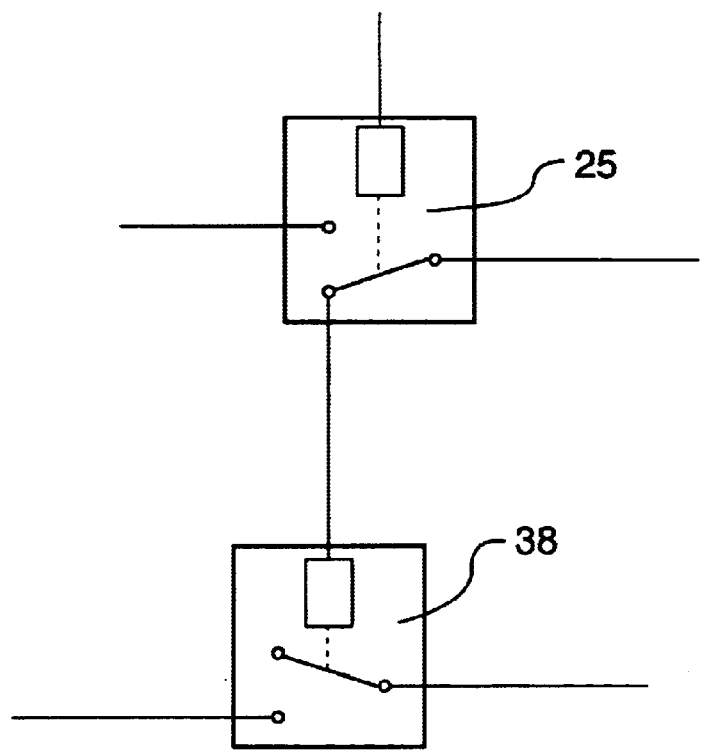

FIG. 8D shows the position of the solenoid switch 38 and air conditioning relay switch 25 when the vehicle's primary engine is off, the auxiliary system is switched on, and the air conditioning controls are switched off. FIG. 8E shows the same engine off and auxiliary system on situation, but with the air conditioning system switched on and cycling the electric motor 1 on. FIG. 8F shows the situation as FIG. 8E, but with the air conditioning system cycling the electric motor 1 off.

The system according to the invention is primarily intended for use on trucks, but any vehicle having a large primary engine can benefit from the system, for example boats, large cars or buses. As mentioned previously, apart from circuit elements, the system only adds the auxiliary motor, the electric motor and its centrifugal clutch, a pulley on the front of the compressor drive shaft, and a drive belt. The system is simply added to the existing air conditioning system, without modifying the existing system.

In addition to advantages mentioned above, the invention has the following advantages:

a. Electric devices can be powered from the vehicle battery when the vehicle primary engine and charging system is not in operation, without draining the battery.

b. The vehicle air conditioning system can be used when the vehicle primary engine is not in operation. This will dramatically lower the pollution generated during operation of the air conditioning system during vehicle stand-still periods.

c. The system is simple in construction and compact, making it cheap to produce and easy to install. The compact design also keeps the total system weight down to a minimum. Furthermore, the simplicity in construction keeps system maintenance costs down.

d. Vehicle external lighting and warning systems as well as internal lighting systems can be operated for prolonged periods of time, without draining the battery.

e. The system can be used as a backup charging system, should the primary charging system fail.

It will be appreciated that the above description relates to the preferred embodiment by way of example only. Many variations on the invention will be obvious to those knowledgeable in the field, and such obvious variations are within the scope of the invention as described and claimed, whether or not expressly described.

What is claimed is:

1. An auxiliary system for a vehicle having an air conditioning system with an air conditioning compressor with a drive shaft normally driven by a primary engine of the vehicle via an electromagnetic clutch, controlled by air conditioning controls of the vehicle said auxiliary system comprising:

an electric motor;

a one way clutch and pulley on an output shaft of said electric motor, said one way clutch acting such that rotation of said electric motor output shaft produces rotation of said pulley but rotation of said pulley does not produce rotation of said electric motor output shaft;

a pulley mounted directly on the drive shaft of said air conditioning compressor;

a drive belt between said pulleys; and control means for engaging said electric motor only when said primary engine is not operating and when air conditioning is called for by air conditioning controls of said vehicle, whereby said electric motor then rotates said one way clutch and pulleys and thereby drives said air conditioner compressor, said control means comprising a power diversion circuitry which routes power from said air conditioning controls of said vehicle to said electromagnetic clutch in normal operation of said vehicle, and away from said electromagnetic clutch and instead to said a means for switching connected to electric motor when said auxiliary system is engaged.

2. An auxiliary system as in claim 1, wherein said one way clutch on said output shaft of said electric motor is a centrifugal clutch.

3. An auxiliary system as in claim 1, further comprising an electric cooling fan operable for selectively cooling air conditioning fluid from said air conditioning system.

4. An auxiliary system as in claim 1, further comprising an auxiliary power source to generate electricity to charge a battery of the vehicle battery, for operation of at least one of said electric motor and vehicle accessories.

5. An auxiliary system as in claim 4, wherein said one way clutch on said output shaft of said electric motor is a centrifugal clutch.

6. An auxiliary system as in claim 4, further comprising an electric cooling fan operable for selectively cooling air conditioning fluid from said air conditioning system.

7. An auxiliary system as in claim 4, wherein said auxiliary power source is selected from the group consisting of a small gasoline motor, a small diesel motor, an electric motor powered by solar cells, and an electric motor powered by connection to an electrical outlet.

8. An auxiliary system as in claim 1, wherein said power diversion circuitry comprises a relay for said routing of power to said electromagnetic clutch in normal operation of said vehicle, and away from said electromagnetic clutch and instead to said means for switching connected to electric motor when said auxiliary system is engaged.

9. An auxiliary system as in claim 2, wherein said power diversion circuitry comprises a relay for said routing of power to said electromagnetic clutch in normal operation of said vehicle, and away from said electromagnetic clutch and instead to said means for switching connected to electric motor when said auxiliary system is engaged.

10. An auxiliary system as in claim 3, wherein said power diversion circuitry comprises a relay for said routing of power to said electromagnetic clutch in normal operation of said vehicle, and away from said electromagnetic clutch and instead to said means for switching connected to electric motor when said auxiliary system is engaged.

11. An auxiliary system as in claim 4, wherein said power diversion circuitry comprises a relay for said routing of power to said electromagnetic clutch in normal operation of said vehicle, and away from said electromagnetic clutch and instead to said means for switching connected to electric motor when said auxiliary system is engaged.

12. An auxiliary system as in claim 5, wherein said power diversion circuitry comprises a relay for said routing of power to said electromagnetic clutch in normal operation of said vehicle, and away from said electromagnetic clutch and instead to said means for switching connected to electric motor when said auxiliary system is engaged.

13. An auxiliary system as in claim 6, wherein said power diversion circuitry comprises a relay for said routing of power to said electromagnetic clutch in normal operation of said vehicle, and away from said electromagnetic clutch and instead to said means for switching connected to electric motor when said auxiliary system is engaged.

14. An auxiliary system as in claim 7, wherein said power diversion circuitry comprises a relay for said routing of power to said electromagnetic clutch in normal operation of said vehicle, and away from said electromagnetic clutch and instead to said means for switching connected to electric motor when said auxiliary system is engaged.

* * * * *